United States Patent [19]

Kimura

[11] Patent Number: 4,710,595
[45] Date of Patent: Dec. 1, 1987

[54] COORDINATE INPUT DEVICE
[75] Inventor: Kiyoshi Kimura, Miyagi, Japan
[73] Assignee: Alps Electric Co., Ltd., Japan
[21] Appl. No.: 941,160
[22] Filed: Dec. 12, 1986
[30] Foreign Application Priority Data
  Jan. 25, 1986 [JP] Japan ............................... 61-8397[U]
[51] Int. Cl.$^4$ ............................................. G08C 21/00
[52] U.S. Cl. ......................................... 178/18; 178/19
[58] Field of Search .................... 178/18, 19; 324/207, 324/208

[56] References Cited
U.S. PATENT DOCUMENTS

| 3,732,369 | 5/1973 | Cotter | 178/18 |
| 3,904,822 | 9/1975 | Kamm et al. | 178/19 |
| 4,054,746 | 10/1977 | Kamm | 178/19 |
| 4,582,955 | 4/1986 | Blesser | 178/19 |

Primary Examiner—Stafford D. Schreyer
Attorney, Agent, or Firm—Guy W. Shoup

[57] ABSTRACT

A coordinate input device is provided of the type comprising main loops made of conductors embedded parallelly in an input plane, a compensating loop disposed in the vicinity of the common wire of the main loops, switching elements for successively sending out a scanning signal to the individual main loops, a switching element for sending out a current to the compensating loop, a current drive circuit pertinent to the main loops, and a current drive circuit pertinent to the compensating loop, wherein a position is obtained on the basis of signals detected by a coordinate designating means capable of pointing out any spot on the input plane, which is characterized in that the output side of the main loops is connected with the input side of the compensating loop, whereby the total consumption power is not increased even by addition of the compensating loop.

4 Claims, 5 Drawing Figures

COORDINATE INPUT DEVICE

BACKGROUND OF THE INVENTION

1. Field of the Invention

This invention relates to a coordinate input device adapted for reading at a high precision a designated position on an input plane.

2. Description of the Prior Art

One conventional type of coordinate input device for reading at a high precision a designated position on a plane operates in such a manner that in response to successive selection of two given loops among a plurality of main loops embedded in an input plane, it detects by means of a pickup the magnetic field strength before and after when the polarity of magnetic field is inverted, converts them into voltages, and calculates from these voltages the position of the pickup. Further, in order to reduce a calculation error, two loops are selected and a variation characteristic is made linear in the vicinity of the inverted position of the field polarity.

However, even if the process of calculation is performed through selection of two loops in such a manner as above, the position where the magnetic field is inverted shifts between the two selected loops toward either loop in the vicinity of the common wire (a source line) of the main loops owing to an influence of the magnetic field generated by the common wire, hence, there is a fear that the foregoing process of calculation will not assure a sufficient degree of precision.

Another type of coordinate input device wherein coordinates are detected through successive selection of the loops one at a time is proposed by the present applicant to reduce the number of circuit components and permit random access to the loops to thereby enhance the processing speed. This type, however, has the aforementioned problem of shift also. To solve such a problem, a compensating loop is disposed in the vicinity of the common wire and a current is caused to flow through the compensating loop in the opposite direction to that of the common wire, whereby the process of coordinate detection is performed in the state in which a magnetic field generated by the common wire is cancelled out or weakened by another magnetic field generated by the compensating loop. FIG. 2 is a fundamental block diagram of this second type coordinate input device.

In FIG. 2, the coordinate input device comprises an input plane 2b equipped with main loops 2a and a compensating loop 3a, a driver 2 for sending out a current of certain amplitude from an oscillator 1 to the main loops 2a, a driver 3 for sending a current to the compensating loop 3a, a pickup 6 including a magnetic field detecting coil and functioning as a coordinate detecting member, an amplifier circuit 7 for amplifying the output detected of the pickup 6, a polarity discriminator circuit 8, a detector circuit 9, a sample-hold amplifiers 11 and 12, a multiplexer 13, an A/D converter 14, a ROM table 15 functioning as a first memory means for storing compensation values, another ROM table 16 functioning as a second memory means for storing interpolation error correction values, and a control circuit 10. In addition, there are provided an X-direction switching circuit 4 in connection with the X-direction group of main loops 2a and a Y-direction switching circuit 5 in connection with the Y-direction group of main loops 2a.

The main loops 2a are embedded mutually parallelly in the input plane 2b at 5 mm intervals, one end of each loop L being connected to the switching circuit 4 (or, to the switching circuit 5 in the case of the Y-direction group) with the other end connected to a source line 2s, and are dimensioned so as to form an input plane surface measuring, for example, 200 mm × 200 mm as a whole. The source line 2s is connected to the driver 2. The Y-direction loops are similarly disposed and oriented so as to intersect orthogonally the X-direction loops.

The compensating loop 3a is formed by a conductor independent of the main loops 2a, which is disposed in the vicinity of the source line 2s of the main loops 2a so as to surround all the main loops 2a, one end of this compensating loop 3a being connected to the driver 3 for sending thereto a current of certain amplitude in reverse to the current flowing through the source line 2s of the main loop 2a with the other end grounded.

In the ROM table 15 functioning as the first memory means for storing compensation values, there are stored compensation values, such as those listed in Table 1, in relation to each loop L and each Y-direction zone.

TABLE 1

| | Compensation Value: ISC | | | | | | |
|---|---|---|---|---|---|---|---|
| | $Y_{(mm)}$ | | | | | | |
| $X_{(mm)}$ | 20 (180) | 25 (175) | 30 (170) | 40 (160) | 60 (140) | 80 (120) | 100 |
| 5 | 0.486 | 0.471 | 0.455 | 0.425 | 0.382 | 0.359 | 0.352 |
| 10 | 0.378 | 0.364 | 0.350 | 0.323 | 0.286 | 0.267 | 0.262 |
| 15 | 0.354 | 0.341 | 0.328 | 0.304 | 0.269 | 0.252 | 0.246 |
| 20 | 0.357 | 0.345 | 0.332 | 0.309 | 0.276 | 0.259 | 0.254 |
| 25 | 0.368 | 0.357 | 0.345 | 0.323 | 0.292 | 0.275 | 0.269 |
| 30 | 0.382 | 0.372 | 0.361 | 0.340 | 0.310 | 0.293 | 0.288 |

The ROM table 15 is referred to in accordance with the detection results of the control circuit 10, and a pertinent compensation value ISC is called up by the control circuit 10 and used to calculate an interpolation value by means of an arithmetic means included in the control circuit 10.

The ROM table 16 functioning as the second memory means for storing correction values is used to obtain an accurate coordinate position from the thus calculated interpolation value through correction of its error. In this table are stored correction values corresponding to each 0.1 mm increment, for example, of the interpolation value pertinent to a segment detected. An example is listed in Table 2.

Specifically, the correction values listed in Table 2 are applicable to from 0.00 mm to 2.00 mm of the interpolation value, on condition that Y = 100 mm and Z (detection height) = 15 mm, in the segment of from X = 95 mm to X = 105 mm.

According to Table 2, in case the interpolation value is calculated, for example, to be 0.90 mm, 0.67 mm is selected.

TABLE 2

| Correction Value | |
|---|---|
| Interpolation value (mm) | Correction value (mm) |
| 0.00 | 0.00 |
| 0.10 | 0.07 |
| 0.20 | 0.14 |
| 0.30 | 0.21 |
| 0.40 | 0.29 |
| 0.50 | 0.36 |
| 0.60 | 0.44 |
| 0.70 | 0.52 |
| 0.80 | 0.59 |

TABLE 2-continued

| Correction Value | |
|---|---|
| Interpolation value (mm) | Correction value (mm) |
| 0.90 | 0.67 |
| 1.00 | 0.75 |
| 1.10 | 0.84 |
| 1.20 | 0.92 |
| 1.30 | 1.00 |
| 1.40 | 1.09 |
| 1.50 | 1.17 |
| 1.60 | 1.26 |
| 1.70 | 1.35 |
| 1.80 | 1.44 |
| 1.90 | 1.53 |
| 2.00 | 1.63 |

The pickup 6 includes in its tip portion the magnetic field detecting coil, a voltage produced by this magnetic field detecting coil being sent via the amplifier circuit 7 to the detector circuit 9 and the polarity discriminator circuit 8. The height at the time of detection of the pickup 6 is a question because the pickup is used to detect the magnetic field generated when each loop L is powered and the height is concerned with errors and the strength of detection (the magnetic field strength). In view of the correlation between the observed error and the vertical component of the magnetic field, the detection height is preferably to be about 1.5 times the pitch of the loops being used for interpolation. The aforementioned detection height, Z=15 mm, was selected on the basis of the foregoing understanding.

The operation of the foregoing coordinate input device will now be described.

The process of detecting the position of the pickup 6 is performed principally, as shown in the flowchart of FIG. 3, through the three steps of detecting a segment or an approximate position of the pickup 6, interpolating or detecting a minute position within the thus detected segment, and combining the segment position and the minute position within the segment.

At the time of segment detection, first, the drivers 2 and 3 are operated by the use of a sinusoidal wave produced by the oscillator 1. In this state, a current is caused by the driver 2 to flow successively through the loops L, one specified via the switching circuits 4 and 5 by the control circuit 10 at a time. During the above, a current having an amplitude one-half that of the current flowing through the main loop 2a is caused by the driver 3 to flow through the compensating loop 3a.

As the current flows through the individual loops L, the magnetic field generated by the effective loop L is detected by the pickup 6 and amplified by the amplifier circuit 7 into a signal of desired amplitude. This signal is compared in terms of phase with the output of the oscillator 1 by the polarity discriminator (phase comparator) circuit 8. In other words, the polarity of the magnetic field is detected in the above process. For example, if the output of the polarity discriminator circuit 8 was assumed to be "H" when the loop L on the left-hand side of the pickup 6 in the drawing was driven, the output of the polarity discriminator circuit changes to and becomes "L" when the loop L on the right-hand side of the pickup 6 was driven because the polarity of the magnetic field being detected has been inverted.

Therefore, as the loops L are successively selected and supplied with a current in the order of $X_0$, $X_1$, $X_2$, ... $X_n$ by the control circuit 10, the output of the polarity discriminator circuit 8 is inverted when the loops L in the vicinity of the pickup 6 are successively supplied with a current, so that the approximate position or pertinent segment of the pickup 6 can be obtained.

When the segment (FIG. 4, SEG=n+1, and so forth) has been detected, the control circuit 10 selects the loop L5(n+1) positioned at the left-hand end of that segment SEG =n+1. At this time, the signal passed through the pickup 6 and the amplifier circuit 7 is converted by means of the detector circuit 9 into a dc signal and held in the sample-hold circuit 11 in the form of a dc voltage.

Then, the control circuit 10 selects the loop L5(n+3) positioned at the right-hand end of the segment SEG=n+1. In this case, the loop L5(n+2) is jumped over and the next loop L5(n+3) is put into process. This scheme is incorporated in order to enhance the preciseness by overlapping the segments mutually by one-half of each width. Then, similarly to the above, the dc voltage obtained by the detector circuit 9 is held in the sample-hold circuit 2.

Subsequent to the above process, the multiplexer 13 selects in accordance with the signal of the control circuit 10 the voltages held in the sample-hold circuits 11 and 12, and the thus selected voltages are converted into the digital form by the A/D converter 14, whereby voltages $V_{n+1}$ and $V_{n+3}$ pertinent to the loops L5(n+1) and L5(n+3) are obtained.

Then, the control circuit 10 turns off both the switching circuits 4 and 5. As a result, the aforementioned predetermined current flows only through the compensating loop 3a, thus, by A/D-converting a detected output it is possible to obtain a voltage $V_c$ pertinent only to the compensating loop 3a through the same process as above.

Subsequently, the control circuit 10 calls up from, for example, Table 1 a compensation value ISC corresponding to the value of the segment in the X- or Y-direction (the distance in that direction) obtained through segment discrimination, and causes the arithmetic means included in the control circuit 10 to calculate an interpolation value P' by substituting the detected voltages $V_{n+1}$, $V_{n+3}$, and $V_c$ and the compensation value ISC in the following equation:

$$P' = \frac{V_{n+1} - ISC \cdot V_c}{V_{n+1} + V_{n+3}} \quad (1)$$

As this interpolation value P' is calculated, a correction value corresponding to that interpolation value is called up from the ROM table 16, in which the correction values for correction of the aforementioned errors are stored, to obtain a coordinate value for specifying a position within the segment. Then, the position coordinate of the segment and the coordinate value within the segment are combined by the arithmetic means to calculate the final X-coordinate of the point position of the pickup 6.

Through a similar process to the above, the Y-coordinate of the point position is calculated and the thus calculated coordinate values are output to the side of a host computer via an interface circuit 17.

FIG. 5 is a practical circuit diagram of the current drive section of the coordinate input device for the main loops 2a and the compensating loop 3a. In this drawing, components corresponding to those of the foregoing coordinate input device bear the same reference numerals as those. That is, this current drive section is composed mainly of the main loops 2a made of parallel conductor loops, the compensating loop 3a disposed in the vicinity of the common wire of the main loops 2a so as to surround the main loops 2a, switching elements 4 provided one per one loop for selectively scanning the individual main loops 2a, a switching element 3b for selecting whether a current is to be sent to the compensating loop 3a or not, a current drive circuit 2 coupled to the main loops 2a, a current drive circuit 3 coupled to the compensating loop 3a, a resistor 2c for restricting the current value of the main loops 2a, and a resistor 3c for restricting the current value of the compensating loop 3a. To the main loops 2a and to the compensating loop 3a is supplied a predetermined current from a power source circuit 20. The current drive circuits 2 and 3 are driven individually by the oscillator 1.

In the foregoing exemplary device, the coordinate position is calculated and determined by sending the scanning signal successively to the individual main loops 2a and as described above, by processing in accordance with the given equation the detected voltages produced by the loops located at the fore and aft positions of a spot where the polarity of the magnetic field is inverted and the detected voltage produced when a compensating current is sent only to the compensating loop 3a. In this process, the question is the ratio of the current caused to flow through the main loops 2a to the current caused to flow through the compensating loop 3a, and this ratio has to be selected relatively on the basis of the relation between the strength of the magnetic field to be weakened, the compensation value to be introduced into the equation, etc. Considering now the case of the current ratio being set, for example, to 2:1, if the current caused to flow through the main loops 2a is denoted as "I", the current caused to flow through the compensating loop 3a should be 0.5 I, thus, the ratio in resistance of the resistor 2c on the side of the main loops 2a to the resistor 3c on the side of the compensating loop 3a is set to 1:2, i.e. R:2R. In driving these loops, the switching element 4 on the side of the main loop 2a and the switching element 3b on the side of the compensating loop 3a are set individually to "L" level. As the result of the foregoing mode of operation, from the power source circuit 20 flow the current I through the main loop 2a and the current 0.5 I through the compensating loop 3a, and under this condition, a detection voltage is obtained by the pickup which is pertinent to the given loop located at the fore position and another detection voltage is also obtained pertinent to the given loop located at the aft position of the spot where the polarity has been inverted. Then, the switching element 4 on the side of the main loop 2a is set to "H" level and the switching element 3b to "L" level, and a detection voltage pertinent to the compensating loop 3a is obtained.

According to the foregoing configuration wherein the predetermined currents are caused to flow respectively through the main loop 2a and the compensating loop 3a, however, the total current 1.5 I, which is the sum of the current I flowing through the main loop 2a and the current 0.5 I flowing through the compensating loop 3a, flows through the current drive section as a whole, thus, the consumption power increases disadvantageously.

SUMMARY OF THE INVENTION

It is the object of the present invention to provide a coordinate input device of the foregoing type whose consumption power is reduced.

To solve the aforementioned problem and to achieve the foregoing object, the present invention provides a coordinate input device comprising main loops made of conductors embedded parallelly in an input plane, a compensating loop disposed in the vicinity of the common wire of the main loops, switching elements for successively sending a scanning signal to the individual main loops, a switching element for sending a current to the compensating loop, a current drive circuit pertinent to the main loops, and a current drive circuit pertinent to the compensating loop, wherein a position is obtained on the basis of signals detected by a coordinate designating means capable of pointing out any spot on the input plane, characterized in that the output side of the main loops is connected with the input side of the compensating loop.

According to the present configuration, at the time of driving concurrently the main loops and the compensating loop, these loops are electrically in series, the current having flowed through the main loop is branched at a given rate, and a part thus branched is caused to flow through the compensating loop, thus, the total consumption power does not increase even by addition of the compensating loop.

BRIEF DESCRIPTION OF THE DRAWINGS

FIGS. 2 through 5 are explanatory of the prior art in which

FIG. 2 is a fundamental block diagram of the coordinate input device;

FIG. 3 is a flowchart explanatory of the detection process;

FIG. 4 is an explanatory diagram of the detection principle; and

FIG. 5 is a circuit diagram showing the important portion of the coordinate input device.

DESCRIPTION OF THE PREFERRED EMBODIMENT

Figure 1:
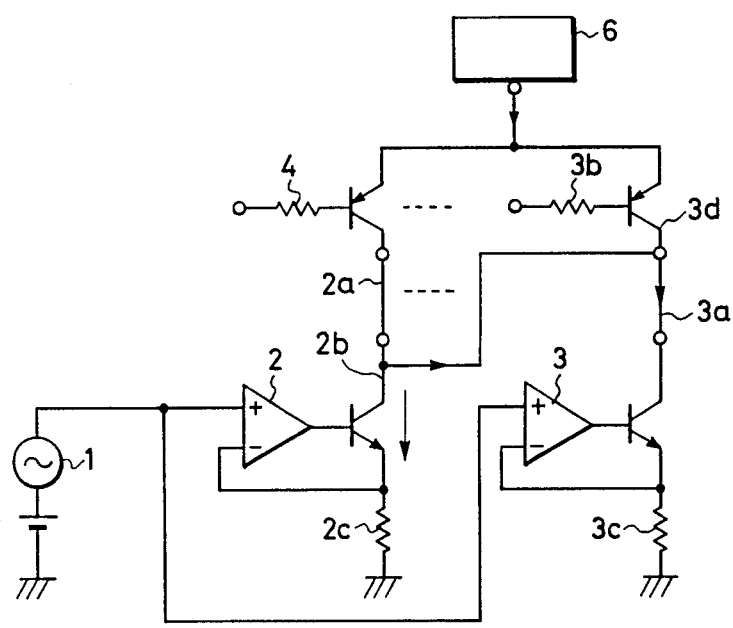
FIG. 1 is a circuit diagram showing the important portion of an embodiment of the present invention.
Figure 2:
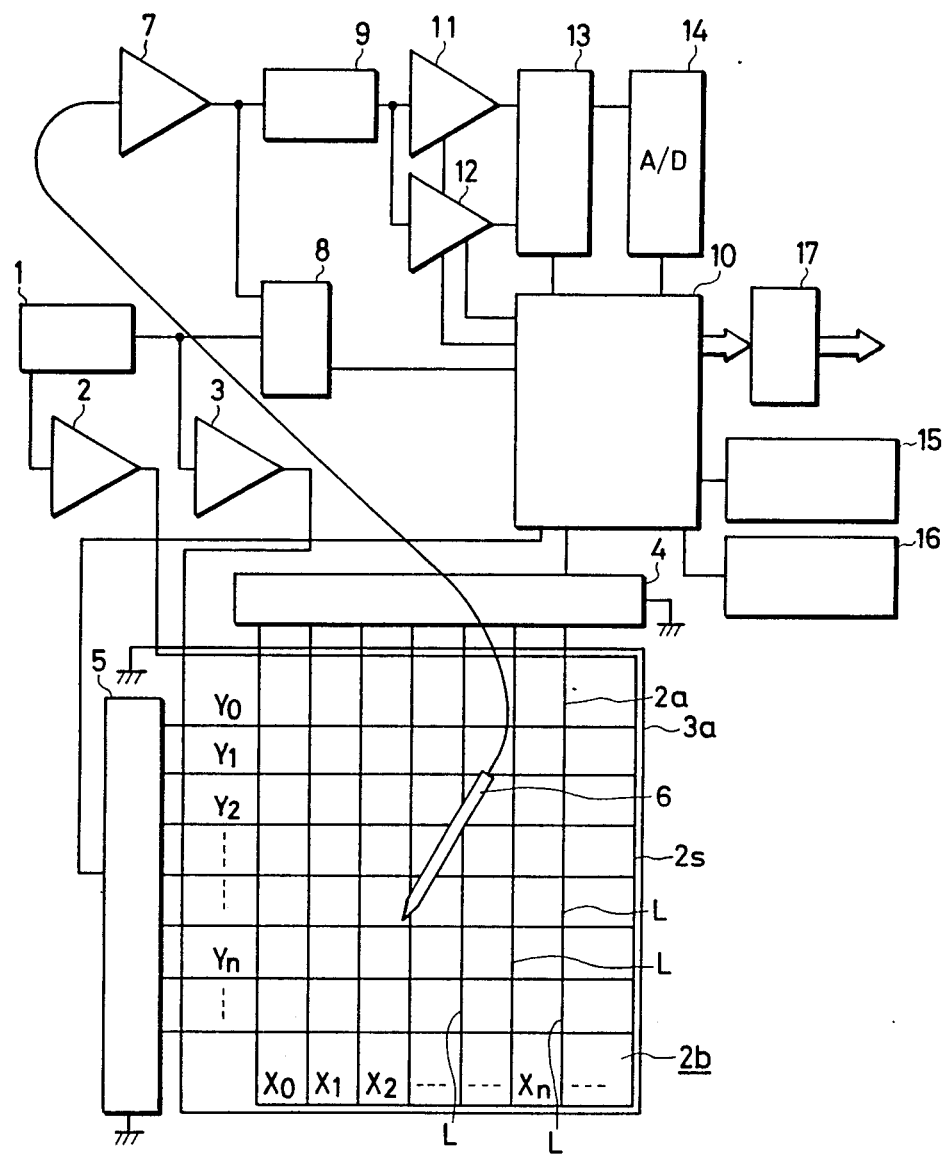
Figure 3:
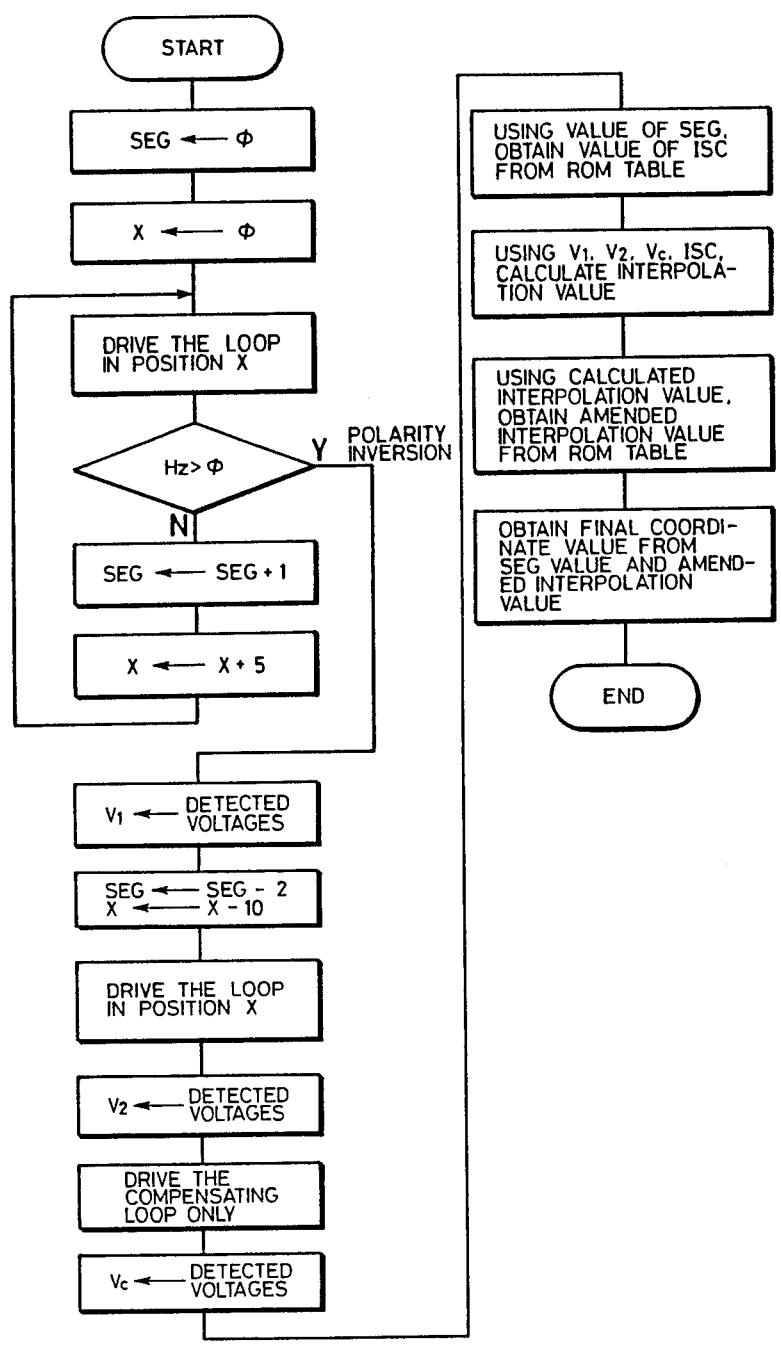
Figure 4:
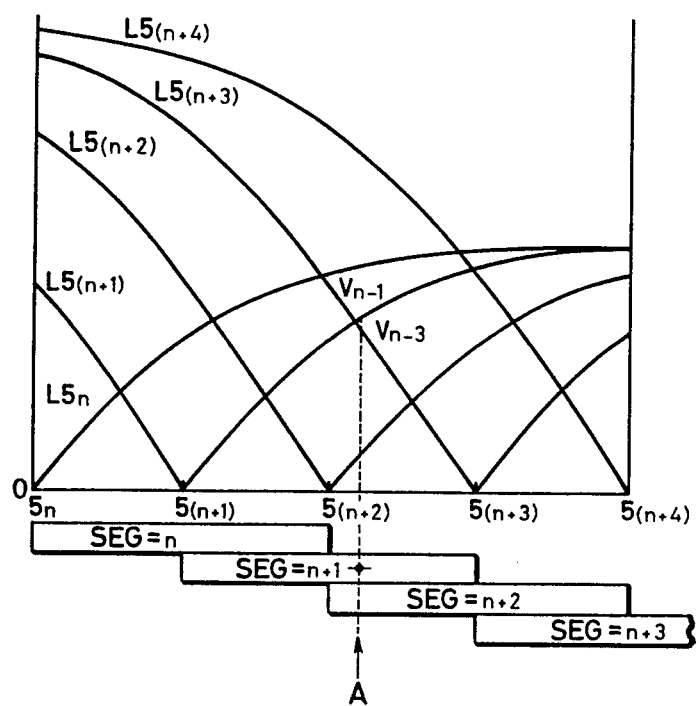

An embodiment of the present invention will now be described with reference to the drawing.

Figure 5:
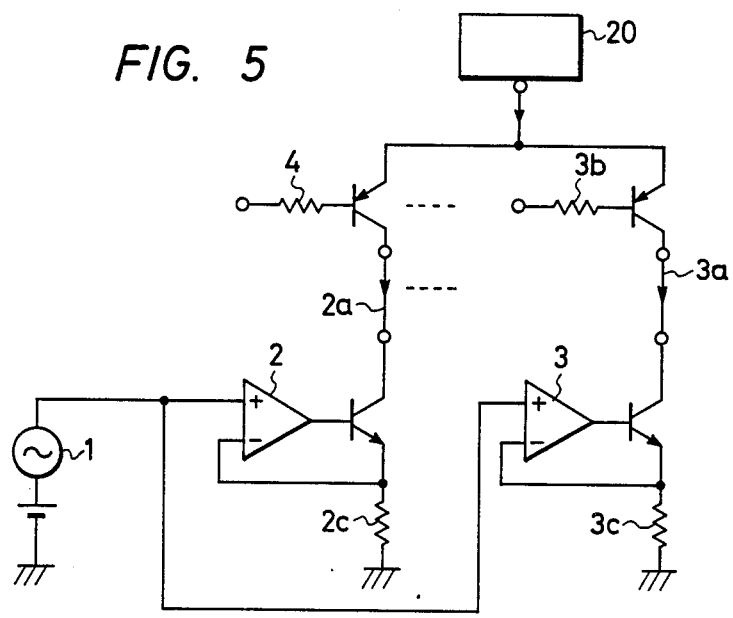

FIG. 1 is a circuit diagram showing the current drive section of a coordinate input device according to the embodiment of the present invention. In this drawing, components corresponding to those of the prior art shown in FIG. 5 bear the same reference numerals as those.

In FIG. 1, the collector side 2b of the current drive circuit 2 for the main loops 2a (i.e. the output side of the main loops 2a) is connected with the collector side 3d of the switching element 3b for the compensating loop 3a (i.e. the input side of the compensating loop 3a), so that a part of the current flowing through the main loop 2a can flow through the compensating loop 3a. The resistances of the resistors 2c and 3c provided between the current drive circuits 2 and 3 and the earth are set to the same value in the embodiment. The other part of the configuration not described herein is identical to the prior art.

The operation of the present coordinate input device of the foregoing configuration will now be described.

The main loops 2a are conductors embedded at equal intervals with a given number of ones arranged in the X direction and another given number of ones arranged in the Y direction, one end each of which is connected with one switching element 4 for selectively driving one loop forming the main loops 2a, so that when the input of the switching element 4 becomes "L" level, the loop corresponding to that switching element 4 is driven. On the other hand, when the input of the switching element 3b becomes "L" level, a current flows directly from the power source circuit through the compensating loop 3a. Accordingly, when the input of any switching element 4 is set to "L" level and the input of the switching element 3b to "H" level, a current flows through the main loop 2a and the compensating loop 3a, as a result, the composite magnetic field is generated on the input plane owing to the main loop 2a and the compensating loop 3a. Thus, as the main loops 2a are scanned by means of the coordinate designating member (the pickup) put on the input plane, the position at which the polarity of the magnetic field has been inverted is detected and voltages pertinent to the composite magnetic fields generated when one loop located at the fore position and another located at the aft position of the spot where the polarity of the magnetic field has been inverted are powered individually are also detected.

Then, the inputs of all switching elements 4 are set to "H" level and the input of the switching element 3b to "L" level. As a result, because the main loops 2a are prevented from being powered, only the compensating loop 3a is powered. In this state, a voltage pertinent to the magnetic field generated by the compensating loop 3a is detected. Then, the coordinate position is calculated on the basis of the detection voltages pertinent to the main loops 2a and the detection voltage pertinent to the compensating loop 3a by performing interpolation in accordance with the aforementioned equation with introduction of the compensation value.

In the foregoing configuration, the current outgoing from the power source circuit 20 in operation is satisfactory with the value of I which is the amount flowing through the main loop 2a. Specifically, when both the main loop 2a and the compensating loop 3a are to be driven concurrently, after having flowed through the main loop 2a the current (I) is divided into two at the collector side point 2b of the current drive circuit 2 so that a current part, 0.5 I, flows through the current drive circuit 2 and the other current part, 0.5 I, flows toward the compensating loop 3a. On the other hand, when only the compensating loop 3a is to be powered, the current is divided into two at the collector side point 3d of the switching element 3b so that a current part, 0.5 I, flows through the compensating loop 3a and the other current part, 0.5 I, flows toward the collector side point 2b of the current drive circuit 2 of the main loops 2a. That is, the current outgoing from the power source circuit has the value I, the main loop receives I, and the compensating loop receives 0.5 I, hence, the current value of I is enough for the whole circuit. Accordingly, as compared with the prior art which consumes a power proportional to the current value 1.5 I, the embodiment of the present invention consumes only a power proportional to the current value I, thus, the present invention can remarkedly reduce the consumption power.

Although the embodiment sets the current ratio of the main loop 2a to the compensating loop 3a to 2:1, this current ratio is a problem in design, thus, has to be determined taking into account various parameters, such as the size of the input plane and the spacing of the loops. In addition, although the embodiment uses transistors as the switching elements 3b and 4, it is to be understood that other types of switching elements can be used.

As described hereinabove, according to the present invention in which the output side of the main loops is connected with the input side of the compensating loop, it is possible to reduce the amount of the current flowing through the whole circuit of the device, thus, there can be provided the coordinate input device whose consumption power is reduced.

What is claimed is:

1. A coordinate input device comprising
   main loops made of conductors embedded parallelly in an input plane,
   a compensating loop disposed in the vicinity of the common wire of said main loops,
   switching elements for successively sending out a scanning signal to said individual main loops,
   a switching element for sending out a current to said compensating loop,
   a current drive circuit pertinent to said main loops, and
   a current drive circuit pertinent to said compensating loop,
   wherein a position is obtained on the basis of signals detected by a coordinate designating means capable of pointing out any spot on said input plane,
   characterized in that the output side of said main loops is connected with the input side of said compensating loop.

2. A coordinate input device according to claim 1, wherein a current whose amplitude is one-half that of said main loop is supplied to said compensating loop.

3. A coordinate input device according to claim 1, wherein the input signal of said current drive circuit for said main loops is identical to that of said current drive circuit for said compensating loop, and the resistance of a resistor for restricting the current of said main loops is set identical to that of a resistor for restricting the current of said compensating loop.

4. A coordinate input device according to claim 1, wherein the current of said compensating loop is caused to flow therethrough in the opposite direction to that of said common wire.

* * * * *